UNITED STATES PATENT OFFICE.

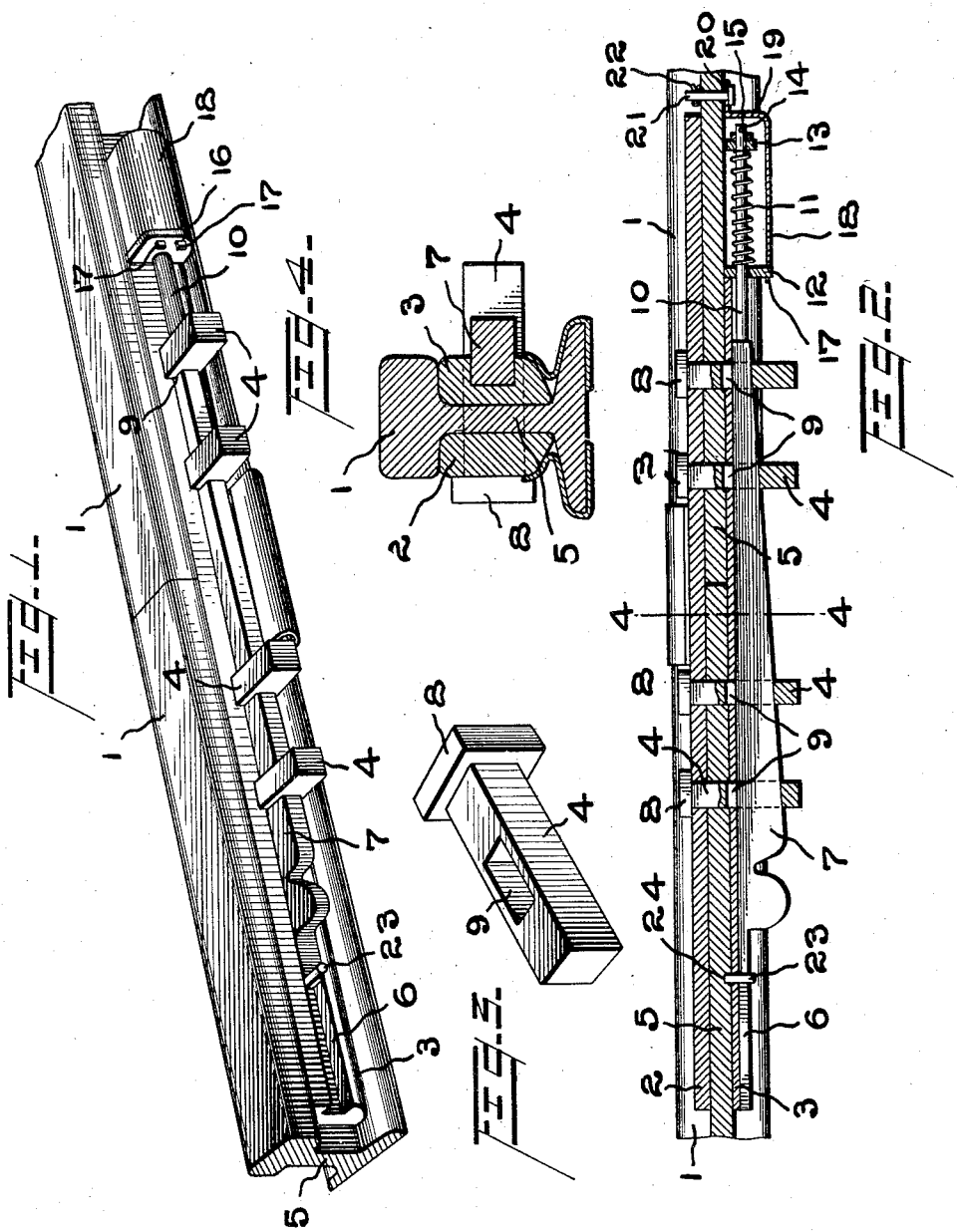

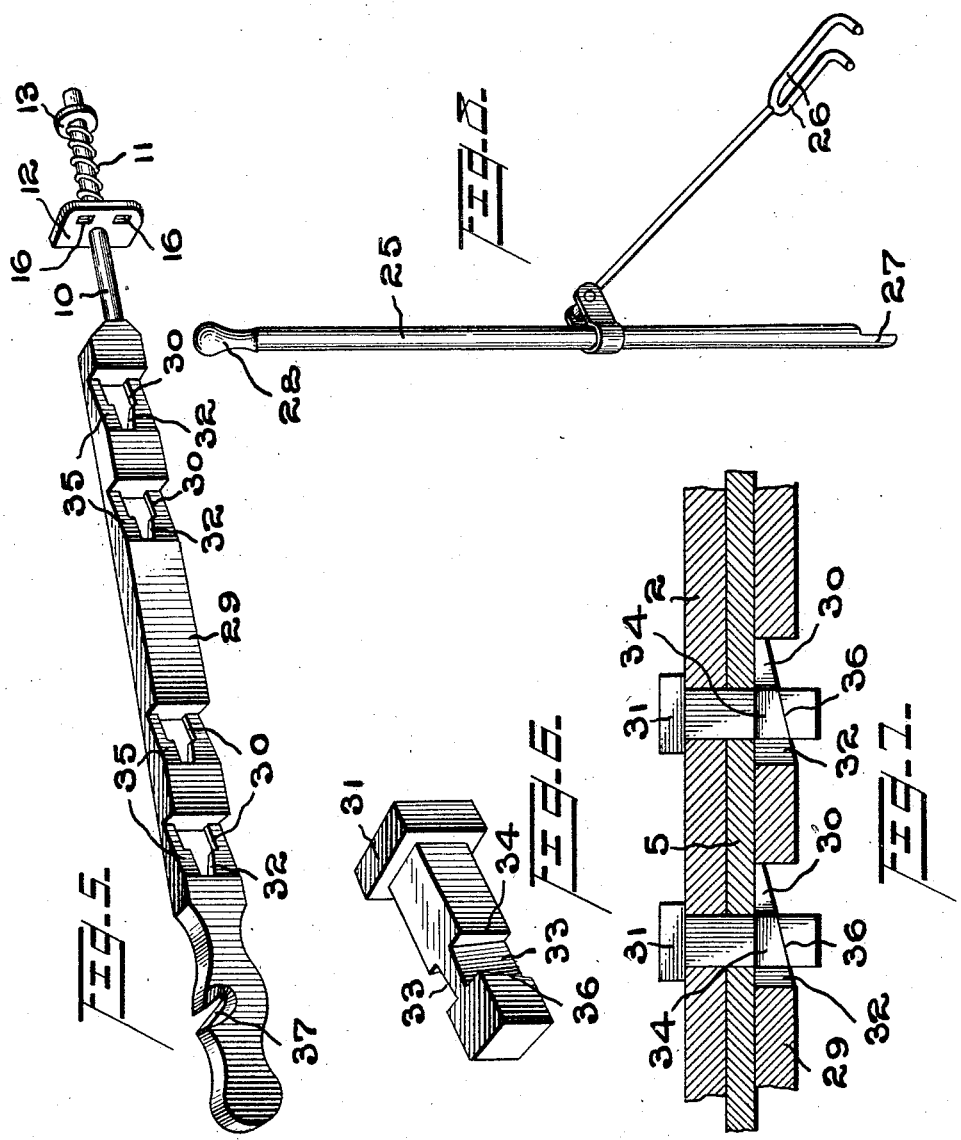

FELIKS SIWAK, OF PHILADELPHIA, PENNSYLVANIA, ASSIGNOR OF ONE-FOURTH TO SOFA SIWAK, ONE-EIGHTH TO BENEDICT KELLER, ONE-EIGHTH TO STANISTOW HATAJKE, ONE-EIGHTH TO PIOTR HENDRICK, AND ONE-EIGHTH TO PAUL HNATSZN, ALL OF PHILADELPHIA, PENNSYLVANIA.

RAIL-JOINT.

1,114,395.      Specification of Letters Patent.      Patented Oct. 20, 1914.

Application filed March 19, 1914. Serial No. 325,861.

*To all whom it may concern:*

Be it known that I, FELIKS SIWAK, a citizen of the United States, residing at Philadelphia, in the county of Philadelphia and State of Pennsylvania, have invented certain new and useful Improvements in Rail-Joints, of which the following is a specification.

My invention relates to improvements in rail joints, and has for one object to provide means whereby the rail sections are held securely together without employing nuts or nut locks on the bolts.

Another object is to provide improvements of this character whereby an improved spring-held wedge lock dispenses with the ordinary nuts and nut locks, and capable of securely locking the entire series of transverse fastening devices of the rail joint.

A further object is to provide an improved locking device which automatically tightens the bolts.

A still further object is to provide a simple, efficient and comparatively inexpensive rail joint of great strength and durability.

With these and other objects in view, the invention consists in certain novel features of construction and combinations and arrangements of parts as will be more fully hereinafter described and pointed out in the claims.

In the accompanying drawings: Figure 1 is a perspective view illustrating my improvements. Fig. 2 is a transverse section through the entire rail joint. Fig. 3 is a perspective view of one of the bolts 4. Fig. 4 is a section taken on the line 4—4 of Fig. 2. Fig. 5 is a perspective view of a modified form of locking bar. Fig. 6 is a perspective view of a modified form of bolt. Fig. 7 is a fragmentary longitudinal section of the locking bar illustrated in Fig. 5, in operative position. Fig. 8 is a perspective view illustrating a tool used in connection with my improved rail joint.

1, 1 are the meeting ends of railway rails which are connected by fish plates 2 and 3, and bolts 4 pass through the fish plates 2 and 3 and through the webs of the rails 5.

The fish plate 3 is provided with a longitudinal groove 6 extending throughout its entire length, in which my improved locking bar 7 is adapted to slide. The bolts 4 are square in cross section and project through registering openings in the rails and fish plates and are provided at one end with enlarged heads 8, and their other ends with slots 9. The locking bar 7 is located in the groove 6 and projects through the slots in all the bolts. In the present form illustrated, four bolts are used. The bolts are similar in construction and therefore the description of one will suffice for all.

The locking bar 7 is of general wedge shape as clearly shown in Fig. 2, and is of sufficient length to engage the entire series of bolts 4. The walls of the slots 9, engaging the sloping edge of the locking bar 7, are at the same angle, so that a good clamping action is exerted upon the bolts 4, and in turn upon the fish plates 2 and 3, thus insuring a tight joint. One end of the locking bar 7 is extended and made cylindrical in form as shown at 10, around which a spring 11 is positioned. The spring is located between a plate 12 at the inner end of the extension, and a washer 13 at the outer end of the extension. The washer 13 is held against longitudinal movement by means of a pin 14 inserted in an opening 15 in the end of the cylindrical extension 10.

The plate 12 bears against the end of fish plate 3, so that the spring exerts a longitudinal pull on the wedge bar. Two slots 16, 16 are provided in the plate 12 to receive lugs 17 of a covering plate 18. The end wall 19 of casing 18 is bent outwardly as shown at 20, forming a lug through which a pin 21 is adapted to be positioned. The pin extends through the web of the rail 5 and is held in position by means of a cotter pin 22. By means of this hood or plate 18, the spring 11 is protected from the weather, yet the construction as explained, will permit the easy removal of the hood when desired.

To prevent an accidental movement of the bar 7, I provide a pin 23, positioned in an opening 24 in the web 5 of the rail, and located at the extreme end of the bar 7 so that when the bar 7 is driven into position, and the pin 23 positioned, it will be impossible for the bar 7 to become displaced.

In operation, the bolts 4 are inserted in openings in the fish plates 2 and 3 and corresponding openings in the web 5 of the rail. The bar 7 is then positioned in the groove 6 of the fish plate 3. As the bar 7 is driven in the groove, it will be guided through the slots 9 of the bolts 4, and will firmly clamp the two sections securely together. The plate 12 is then slipped on the cylindrical extension 10, until its inner edge engages the end of the fish plate 3. The spring 11 is compressed by means of the tool 25, illustrated in Fig. 8, by placing the hooked ends 26 over the washer 13, and then resting the end 27 on a tie, and pulling the handle 28. This will permit the pin 14 to be inserted in the opening 15. The lever is then removed and the hood 18 placed over the spring as described. The spring will exert a constant pressure on the wedge, insuring a tight clamping action at all times.

In the modification illustrated in Fig. 5, the locking bar 29 is provided with a plurality of square openings 30, which are of a dimension large enough to permit the bolts 31 to project therethrough. The rear wall of each opening is provided with a recess 32, the side walls of which are at an incline to exert a wedging action against the walls 33 of recess 34 in the bolts 31. The outer faces of the bar 29 at the openings 30 and recesses 32 are beveled or inclined as shown at 35, and engage the beveled wall 36 of the recess 34 in bolts 31 as clearly shown in Fig. 7. A slot 37 is provided at the end of the bar 29 for a locking pin, as described in the preferred form.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a rail joint, the combination with two rails located end to end, fish plates at opposite sides of the rails, and bolts extending through the rails and the fish plates, of a wedge bar movable longitudinally of the rails and operatively engaging all of the said bolts, and a spring around one end of said bar exerting pressure on the bar, substantially as described.

2. In a rail joint, the combination with two rails located end to end, fish plates at opposite sides of the rails, and bolts extending through the rails and the fish plates, of a wedge bar movable longitudinally of the rails and operatively engaging all of the said bolts, an extension on said bar, and a spring around said extension, exerting pressure on the bar, substantially as described.

3. In a rail joint, the combination with two rails located end to end, fish plates at opposite sides of the rails, and bolts extending through the rails and the fish plates, of a wedge bar movable longitudinally of the rails and operatively engaging all of the said bolts, an extension on said bar, a plate adapted to be positioned on the extension, said plate engaging against one end of one of the fish plates, and a spring around said extension, one end bearing against said plate and exerting a pressure on the bar, substantially as described.

4. In a rail joint, the combination with two rails located end to end, fish plates at opposite sides of the rails, and bolts extending through the rails and the fish plates, of a wedge bar movable longitudinally of the rails and operatively engaging all of the said bolts, an extension on said bar, a plate adapted to be positioned on the extension, said plate engaging against one end of one of the fish plates, a washer on the extension, a pin, said pin adapted to limit the movement of said washer in one direction, and a spring around said extension, one end bearing against said plate, the other end against the washer, and said spring exerting pressure on the said bar, substantially as described.

5. In a rail joint, the combination with two rails located end to end, fish plates at opposite sides of the rails, and bolts extending through the rails and the fish plates, of a wedge bar movable longitudinally of the rails and operatively engaging all of the said bolts, an extension on said bar, a plate adapted to be positioned on the extension, said plate engaging against one end of one of the fish plates, a washer on the extension, a pin, said pin adapted to limit the movement of said washer in one direction, a spring around said extension, one end bearing against said plate, the other end against the washer, said spring exerting pressure on the said bar, a casing covering said spring, lugs on the said casing adapted to engage openings in said plate, substantially as described.

6. In a rail joint, the combination with two rails located end to end, fish plates at opposite sides of the rails and bolts extending through the rails and the fish plates, slots in said bolts, of a wedge bar movable longitudinally of the rails, said bar projected through the slots of said bolts, operatively engaging all of said bolts, an extension on said bar, and a spring around said extension exerting pressure on the bar, substantially as described.

7. In a rail joint, the combination with two rails located end to end, fish plates at opposite sides of the rails, and bolts extending through the rails and the fish plates, slots in said bolts, a groove in one of the said fish plates, of a wedge bar movable longitudinally of the rails in said groove, said bar projected through the slots of said bolts, operatively engaging all of said bolts, an extension on said bar, and a spring around said extension exerting pressure on the bar, substantially as described.

In testimony whereof I have signed my name to this specification in the presence of two subscribing witnesses.

FELIKS SIWAK.

Witnesses:
GEORGE SIWAK,
PAUL F. HNATSZN.